(12) United States Patent
Aono et al.

(10) Patent No.: US 11,003,249 B2
(45) Date of Patent: May 11, 2021

(54) INPUT APPARATUS ACCEPTING A PRESSURE INPUT

(75) Inventors: Tomotake Aono, Yokohama (JP); Kaoru Tashiro, Yokohama (JP); Yuta Shiokawa, Fujisawa (JP)

(73) Assignee: KYOCERA Corporation, Kyoto (JP)

( * ) Notice: Subject to any disclaimer, the term of this patent is extended or adjusted under 35 U.S.C. 154(b) by 1393 days.

(21) Appl. No.: 12/405,997

(22) Filed: Mar. 17, 2009

(65) Prior Publication Data

US 2010/0141410 A1    Jun. 10, 2010

(30) Foreign Application Priority Data

Dec. 9, 2008    (JP) .............................. JP2008-313620

(51) Int. Cl.
*G06F 3/01* (2006.01)
*G06F 3/02* (2006.01)
*G06F 3/0488* (2013.01)
*G06F 3/041* (2006.01)

(52) U.S. Cl.
CPC ............ *G06F 3/016* (2013.01); *G06F 3/0202* (2013.01); *G06F 3/0416* (2013.01); *G06F 3/04886* (2013.01)

(58) Field of Classification Search
USPC ......................................... 340/407.2; 341/22
See application file for complete search history.

(56) References Cited

U.S. PATENT DOCUMENTS

| 6,118,435 A | 9/2000 | Fujita et al. |
| 2005/0156904 A1 | 7/2005 | Katayose |
| 2006/0050059 A1* | 3/2006 | Satoh ....................... G06F 3/016 345/173 |
| 2006/0146032 A1* | 7/2006 | Kajimoto ................ G06F 3/011 345/173 |
| 2007/0236450 A1* | 10/2007 | Colgate ................. G06F 3/0428 345/156 |
| 2007/0257821 A1* | 11/2007 | Son ........................ G06F 3/0446 341/22 |
| 2008/0088600 A1* | 4/2008 | Prest ..................... H01H 25/041 345/173 |

(Continued)

FOREIGN PATENT DOCUMENTS

| EP | 1956466 A1 | 8/2008 |
| JP | 8314369 | 11/1996 |

(Continued)

OTHER PUBLICATIONS

JP 2010-212242 JP Office Action dated Aug. 14, 2012.

(Continued)

*Primary Examiner* — Jack K Wang
(74) *Attorney, Agent, or Firm* — Studebaker & Brackett PC

(57) ABSTRACT

There is provided an input apparatus having a configuration simple enough to be compact and capable of presenting an operator with the same real feeling of pressing as the feeling of operating a push-button switch when the operator operates a pressing-type input unit. The input apparatus includes an input unit which accepts a pressure input; a load detection unit which detects a pressure load to the input unit; a vibration unit which vibrates the input unit; and a control unit which, when the pressure load detected by the load detection unit satisfies a predetermined criterion for accepting an input to the input unit, controls driving of the vibration unit so as to generate a floating force on a pressing object pressing the input unit.

13 Claims, 13 Drawing Sheets

(56) References Cited

U.S. PATENT DOCUMENTS

| | | | |
|---|---|---|---|
| 2009/0036212 A1* | 2/2009 | Provancher | G06F 3/016 463/37 |
| 2009/0072662 A1* | 3/2009 | Sadler | G06F 1/3203 310/319 |
| 2009/0167704 A1* | 7/2009 | Terlizzi | G06F 3/016 345/173 |
| 2009/0250267 A1* | 10/2009 | Heubel | G06F 3/04886 178/18.03 |
| 2009/0273583 A1* | 11/2009 | Norhammar | G06F 3/0436 345/177 |
| 2009/0303199 A1* | 12/2009 | Cho | G06F 3/04845 345/173 |
| 2010/0045360 A1* | 2/2010 | Howard | G01D 5/2013 327/365 |
| 2010/0103126 A1* | 4/2010 | Nakamura et al. | 345/173 |
| 2012/0286847 A1* | 11/2012 | Peshkin | G06F 3/0416 327/517 |

FOREIGN PATENT DOCUMENTS

| | | |
|---|---|---|
| JP | 9319518 | 12/1997 |
| JP | 10-293644 | 11/1998 |
| JP | 2001-255993 | 9/2001 |
| JP | 2005-092472 | 4/2005 |
| JP | 2005-190290 A | 7/2005 |
| JP | 2005-332063 | 12/2005 |
| JP | 2005-150865 A | 6/2006 |
| JP | 2010140102 | 6/2010 |

OTHER PUBLICATIONS

Office Action dated Mar. 12, 2013 in corresponding Japanese Patent Application No. 2010-212242.

Office Action dated Jan. 31, 2013 in corresponding Korean Application No. 10-2011-7013054.

Yamamoto, "Actuator Technologies for Tactile Interfaces," Journal of the Society of Instrument and Control Engineers, 47(7):578-581 (in Korean, no English translation available).

Office Action dated Aug. 29, 2013 in corresponding Korean Patent Application No. 2011-7013054 (Statement of Relevance included), 4 total pages.

Office Action dated Aug. 5, 2013 from corresponding Chinese Patent Application No. 200980149393.X (statement of relevance included), 11 pages.

Office Action dated Mar. 25, 2014, from corresponding Japanese Patent Application No. 2010-212242 (Statement of Relevance included, 12 total pages.

Office Action dated Apr. 25, 2014, from corresponding Chinese Patent Application No. 200980149393.X (Concise Explanation/ Statement of Relevance included), 10 total pages.

Biet, M. et al., "A Piezoelectric Tactile Display Using Travelling Lamb Wave", Proceedings of Eurohaptics, XX,XX, 2006, pp. 567-570, XP002438180.

Watanabe, T. et al., "A Method for Controlling Tactile Sensation of Surface Roughness Using Ultrasonic Vibration", Proceedings of the International Conference on Robotics and Automation, Nagoya, Japan, 1995, pp. 1134-1139, XP000657310.

Extended European Search Report dated Mar. 20, 2017 in counterpart EP patent application No. 09831684.7.

Takasaki et al.; Control parameters for an active type SAW tactile display; Proceedings of 2004 IEEE/RSJ International Conference on Intelligent Robots and Systems; Sep. 28-Oct. 2, 2004, pp. 4044-4049; vol. 4; Sendai, Japan.

Interrogation (translation) for JP 2008-313620, dated Jul. 26, 2011, 4 pages.

* cited by examiner

FIG. 7
(a)
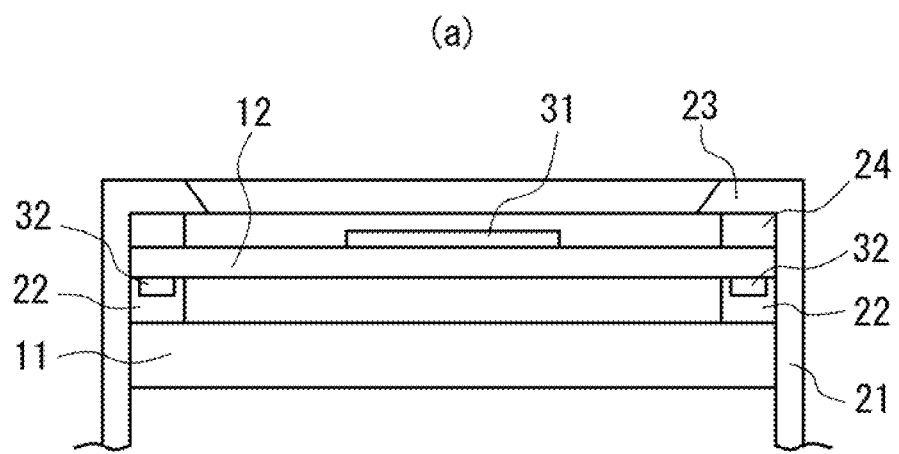
(b)
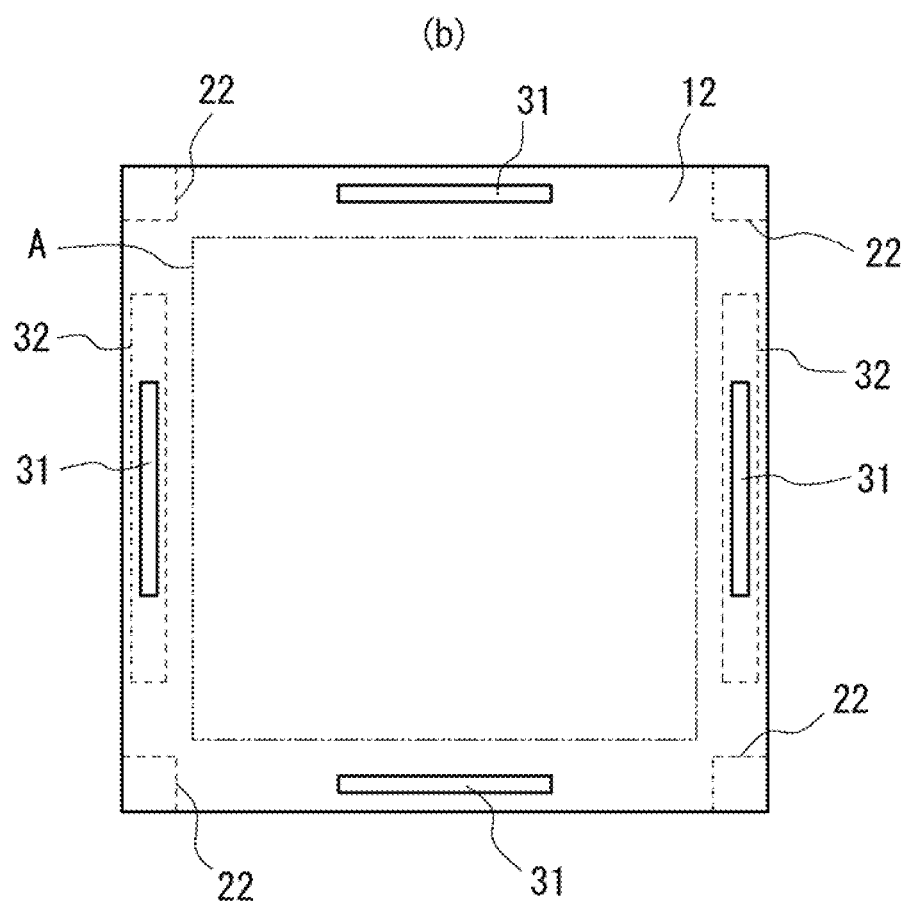

INPUT APPARATUS ACCEPTING A PRESSURE INPUT

CROSS-REFERENCE TO RELATED APPLICATIONS

This application claims priority to Japanese Patent Application No. 2008-313620, filed Dec. 9, 2008, the contents of which are incorporated herein by reference in their entirety.

TECHNICAL FIELD

The present invention relates to an input apparatus having an input unit which accepts a pressure input.

BACKGROUND

Recently, as an input unit which accepts an input operation by a user, an input apparatus having a plate-shaped input unit which accepts an input by pressing a touch panel, a touch switch, and the like, is widely used in information equipment, household electric appliances and the like. Such input units include various types thereof such as a resistive film type and a capacitance type and the like, but all accept an input by a finger or a stylus pen pressing the input unit, and the input unit itself is not changed when pressed in the same manner as when a push-button is pressed.

For this reason, the operator cannot get feedback when the pressure input is accepted. For example, when an input apparatus having a touch panel is used, an input error tends to occur due to an operation error such as pressing the same position several times, which may cause stress on the operator.

In order to prevent such an input error, there has been known a method of confirming an input operation aurally, visually, or tactually by feeding back the input operation such as by generating sound in response to a pressure input, changing the display mode so as to change the display color of an input object such as an input button which is displayed on a display unit corresponding to the pressure area, or driving a vibrator.

However, these feedback methods simply inform the operator that the input has completed, but do not present the operator with a feeling of "pressing" a push-button switch. For this reason, when a touch panel is configured to include an input key of information equipment such as a mobile terminal like a cellular phone, a calculator, and a ticket vending machine, or an input key of the operation unit of a household electric appliance such as a microwave oven and a TV, and the above feedback technologies are applied to the touch panel, the operator feels uncomfortable using the touch panel.

Further, in the case of a feedback method of appealing to a sense of hearing, confirmation is difficult in a noisy environment. If the device in use is in a mute state such as in a manner mode or the like, the method does not work. Moreover, in the case of a feedback method of appealing to a sense of sight, when a small input object is displayed on the display unit, and particularly in the case of a finger input, the input object is hidden behind the finger and the change of the display mode may be difficult to confirm.

Alternatively, as still another feedback method, Japanese Patent Laid-Open No. 2005-92472 proposes a method by which when the operator press a display area of a touch operation member (input object) displayed on a display panel of a display device having a touch panel, the touch panel moves in a direction opposite to the pressing direction, and when the force of pressing the display area is equal to or greater than a predetermined value, the touch panel moves in the pressing direction.

According to the display device disclosed in Japanese Patent Laid-Open No. 2005-92472, when the operator presses the input object displayed on the display panel with a pressing force equal to or greater than a predetermined value, the touch panel moves in the pressing direction, and thus the operator can get a feeling of pressing the touch panel.

However, this display device may cause a problem in that the moving mechanism becomes complicated and the entire device grows in size since the touch panel is configured to be moved together with the display panel. Further, the operator can only get a feeling of pressing the touch panel, but this feedback is quite different from a feeling of pressing a push-button switch.

SUMMARY OF INVENTION

The presently disclosed embodiments are directed to solving issues relating to one or more of the problems presented in the prior art, as well as providing additional features that will become readily apparent by reference to the following detailed description when taken in conjunction with the accompanying drawings. An object of the present disclosure is to provide an input apparatus having a configuration simple enough to be compact and capable of presenting an operator with the same real feeling of pressing as the feeling of operating a push-button switch when the operator operates a pressing-type input unit.

In order to achieve the above object, an input apparatus in accordance with an embodiment of the present disclosure includes: an input unit which accepts a pressure input; a load detection unit which detects a pressure load to the input unit; a vibration unit which vibrates the input unit; and a control unit which, when the pressure load detected by the load detection unit satisfies a predetermined criterion for accepting an input to the input unit, controls driving of the vibration unit so as to generate a floating force on a pressing object pressing the input unit.

According to another embodiment, when the control unit accepts the input to the input unit, and then the pressure load detected by the load detection unit satisfies a predetermined criterion, the control unit controls driving of the vibration unit so as to generate a floating force on the pressing object.

According to yet another embodiment, the input apparatus includes: an input object which is formed on the input unit; and a position detection unit which detects an input position to the input unit, wherein when the position detection unit detects the input position where the input object is formed, the control unit controls driving of the vibration unit.

Further, an input apparatus according to another embodiment includes: a display unit which displays an input object; an input unit which accepts a pressure input to the display unit; a load detection unit which detects a pressure load to the input unit; a vibration unit which vibrates the input unit; and a control unit which, when an input to the input unit is an input to the input object displayed on the display unit, and the pressure load detected by the load detection unit satisfies a predetermined criterion for accepting the input, the control unit controls driving of the vibration unit so as to generate a floating force on the pressing object pressing the input unit.

According to another embodiment, when the control unit accepts the input to the input unit, and then the pressure load detected by the load detection unit satisfies a predetermined criterion, the control unit controls driving of the vibration unit so as to generate a floating force on the pressing object.

Further, an input apparatus according to another embodiment includes: an input unit which accepts a pressure input; a load detection unit which detects a pressure load to the input unit; a vibration unit which vibrates the input unit; and a control unit which, when the pressure load detected by the load detection unit satisfies a predetermined criterion for accepting an input to the input unit, controls driving of the vibration unit so as to produce a squeeze film effect on a pressing object pressing the input unit.

According to another embodiment, when the control unit accepts the input to the input unit, and then the pressure load detected by the load detection unit satisfies a predetermined criterion, the control unit controls driving of the vibration unit so as to produce a squeeze film effect on the pressing object.

According to another embodiment, the input apparatus includes: an input object which is formed on the input unit; and a position detection unit which detects an input position to the input unit, wherein when the position detection unit detects the input position where the input object is formed, the control unit controls driving of the vibration unit.

Further, an input apparatus according to another embodiment includes: a display unit which displays an input object; an input unit which accepts a pressure input to the display unit; a load detection unit which detects a pressure load to the input unit; a vibration unit which vibrates the input unit; and a control unit which, when an input to the input unit is an input to the input object displayed on the display unit, and the pressure load detected by the load detection unit satisfies a predetermined criterion for accepting the input, the control unit controls driving of the vibration unit so as to produce a squeeze film effect on a pressing object pressing the input unit.

According to another embodiment, when the control unit accepts the input to the input unit, and then the pressure load detected by the load detection unit satisfies a predetermined criterion, the control unit controls driving of the vibration unit so as to produce a squeeze film effect on the pressing object.

Further, an input apparatus according to another embodiment includes: an input unit which accepts a pressure input; a load detection unit which detects a pressure load to the input unit; a vibration unit which vibrates the input unit; and a control unit which, when the pressure load detected by the load detection unit satisfies a predetermined criterion for accepting an input to the input unit, controls driving of the vibration unit so as to reduce a frictional force between the input unit and the pressing object pressing the input unit.

According to another embodiment, when the control unit accepts the input to the input unit, and then the pressure load detected by the load detection unit satisfies a predetermined criterion, the control unit controls driving of the vibration unit so as to reduce a frictional force between the pressing object and the input unit.

According to another embodiment, the input apparatus includes: an input object which is formed on the input unit; and a position detection unit which detects an input position to the input unit, wherein when the position detection unit detects the input position where the input object is formed, the control unit controls driving of the vibration unit.

Further, an input apparatus according to another embodiment includes: a display unit which displays an input object; an input unit which accepts a pressure input to the display unit; a load detection unit which detects a pressure load to the input unit; a vibration unit which vibrates the input unit; and a control unit which, when an input to the input unit is an input to the input object displayed on the display unit, and the pressure load detected by the load detection unit satisfies a predetermined criterion for accepting the input, the control unit controls driving of the vibration unit so as to reduce a frictional force between the input unit and the pressing object pressing the input unit.

According to another embodiment, when the control unit accepts the input to the input unit, and then the pressure load detected by the load detection unit satisfies a predetermined criterion, the control unit controls driving of the vibration unit so as to reduce a frictional force between the pressing object and the input unit.

According to embodiments of the present disclosure, when a pressure load to the input unit satisfies a predetermined criterion for accepting an input, the input unit is vibrated to generate a floating force, so that the input apparatus has a configuration simple enough to be compact and can present the operator with the same feeling of pressing as the feeling of operating a push-button switch.

Further features and advantages of the present disclosure, as well as the structure and operation of various embodiments of the present disclosure, are described in detail below with reference to the accompanying drawings.

BRIEF DESCRIPTION OF DRAWINGS

The present disclosure, in accordance with one or more various embodiments, is described in detail with reference to the following Figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 7 illustrates an example structure of implementing the input apparatus shown in FIG. 6, according to an embodiment;

DESCRIPTION OF VARIOUS EMBODIMENTS

Figure 1:
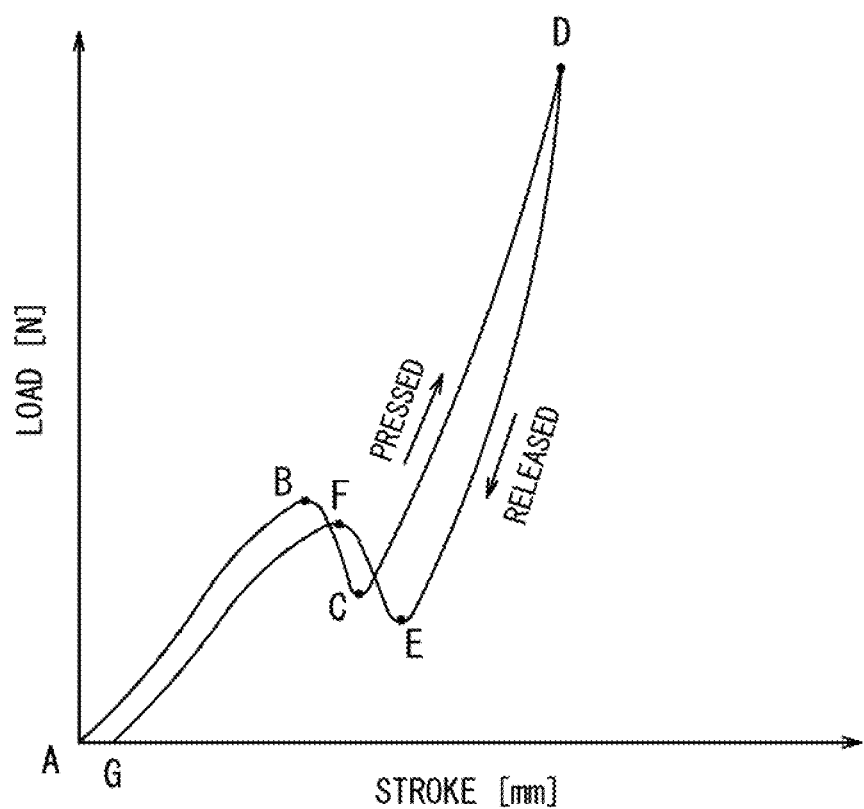
FIG. 1 illustrates a general load characteristic of a push-button switch, according to an embodiment.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

First, before describing embodiments of the present disclosure, the principle of a method of presenting a feeling of pressing using an input apparatus in accordance with the present disclosure will be described.

As a push-button switch used in information equipment and a household electric appliance, for example, a metal dome switch, an embossed switch, a rubber switch, a tactile switch, and the like are widely known. In general, these general push-button switches have load characteristics as shown in FIG. 1 with some differences in the stroke of a push-button and applied load (pressing force) depending on the type of switch.

Figure 2:
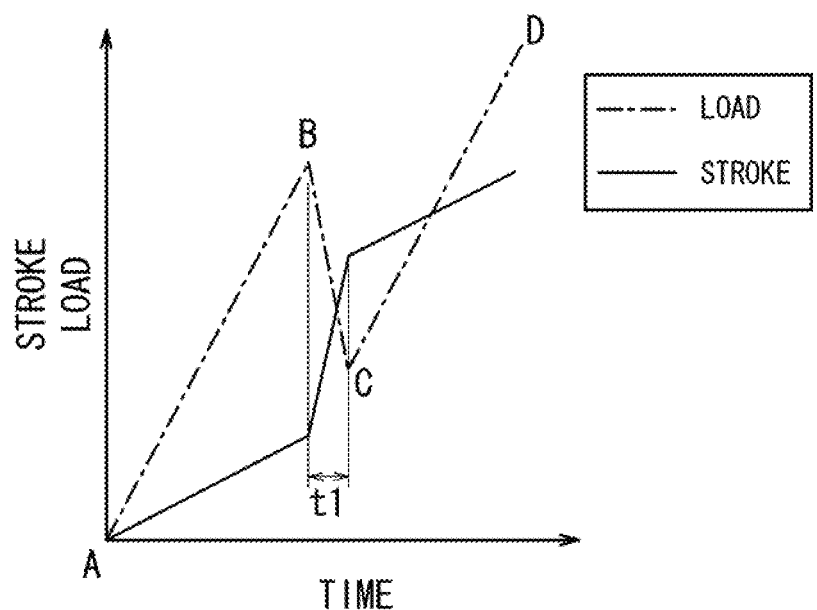
FIG. 2 illustrates a time variation of a load and a stroke in a load characteristic when pressed as shown in FIG. 1, according to an embodiment.

With reference to FIG. 1, the period from point A to point B of the load characteristic line when a push-button is pressed indicates that the load increases almost in proportion to the pressing starting at when the push-button is pressed. The period from point B to point C indicates that the load rapidly decreases as a convex shaped elastic member such as a metal dome is buckled as the push-button is pressed. The period from point C to point D indicates that the load increases almost in proportion to the pressing as the switch contact point is closed. FIG. 2 illustrates the time variation of the load and the stroke in the load characteristic when pressed.

Figure 3:
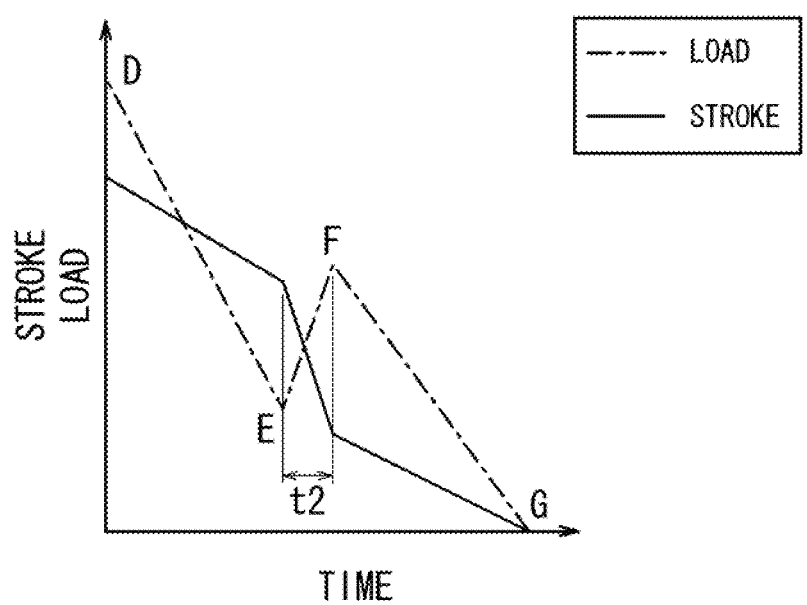
FIG. 3 illustrates a time variation of the load and the stroke in a load characteristic when released as shown in FIG. 1, according to an embodiment.

Moreover, the load characteristics when the push button is released have some hysteresis, but show an opposite change when the push button is pressed. That is, the period from point D to point E indicates that the load decreases almost in proportion to the releasing starting at when the push button is released, and the switch contact point is kept closed. The period from point E to point F indicates that the load rapidly increases as the elastic member returns to the convex shape from the buckled state as the push button is released, and the switch contact point is opened starting at this period. The period from point F to point G corresponds to the period from when the elastic member returns to its original state to when the finger is released from the push button, and indicates that the load decreases almost in proportion to the releasing. Therefore, as shown in FIG. 3, the time variation of the load and stroke when released shows an opposite pattern shown in FIG. 2.

It should be noted that with reference to the load characteristics shown in FIG. 1, the maximum stroke of the push button is very small such as being equal to or less than 1 mm for a metal dome switch, an embossed switch, and a tactile switch, and being equal to or less than 3 mm for a rubber switch. In addition, the load in point B is in the vicinity of 1N to 4N for a metal dome switch, an embossed switch, and a tactile switch, and is in the vicinity of 0.5N for a rubber switch.

There is a transition phenomenon from point B to point C of FIG. 1 that the operator recognizes a feeling of pressing, namely, a phenomenon that the load rapidly decreases in the process of pressing the push button. Therefore, this phenomenon given to the tip of the finger pressing the plate-shaped input unit can present the operator with a feeling of pressing.

Figure 4:
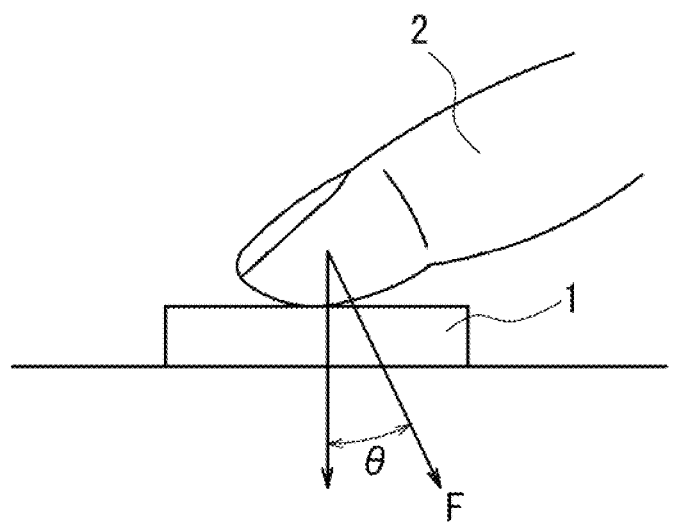
FIG. 4 explains the results of a study on a pressing direction when a plate is pressed with a finger, according to an embodiment.

As shown in FIG. 4, it was found that even if the operator intended to press the plate 1 with the finger 2 pressing the plate 1 in a direction parallel to the pressing direction (normal direction) of the plate 1, in a precise sense, the operator pressed the plate 1 in a direction shifted by θ with respect to the normal direction from the effect of joints of the finger 2 and the like, and thus a pressure force element is found in the tangential direction orthogonal to the normal direction.

It was also found that a human finger tip can clearly feel the change in load, but cannot clearly detect the difference in stroke as small as 3 mm, for example, described above; and a human finger tip slipped by a small amount in the tangential direction of the input unit cannot distinguish whether the phenomenon is caused by the slippage or the change in stroke.

When the plate is pressed with the finger, even if the plate actually makes almost no displacement in the normal direction, by producing a squeeze film effect on the finger pressing the plate in the course of pressing to generate a floating force and to rapidly decrease the pressure force element in the tangential direction (in plane direction) orthogonal to the normal direction, the feeling when the convex shaped elastic member of the push-button switch is bent and buckled can be represented.

In other words, when the load applied to the plate reaches a predetermined value, the plate is vibrated to produce a squeeze film effect on the finger, which generates a floating force on the finger and reduces the frictional resistance (frictional force) between the plate and the finger to allow the fingertip to slip a little, which can provide the operator with an illusion that the load rapidly decreases. By doing so, the load characteristics when pressed can be expressed in the same manner as in FIG. 1, which can present the operator with the same feeling as the feeling of operating the push-button switch.

Here, the squeeze film effect refers to a phenomenon (of generating a squeeze film) that when two flat surfaces having large enough areas with respect to the distance rapidly approach each other, the pressure of a fluid layer between the two flat surfaces increases and a repulsive force occurs. This effect reduces the frictional force between the flat surfaces. The typical examples of theories explaining this squeeze film effect include Langevin's radiation pressure theory in the acoustic field and the squeeze film pressure theory in the lubrication field. These theories use an ultrasonic range frequency to vibrate a vibrating surface and calculate the floating force which occurs through a fluid layer such as air above the vibrating surface.

Figure 5:
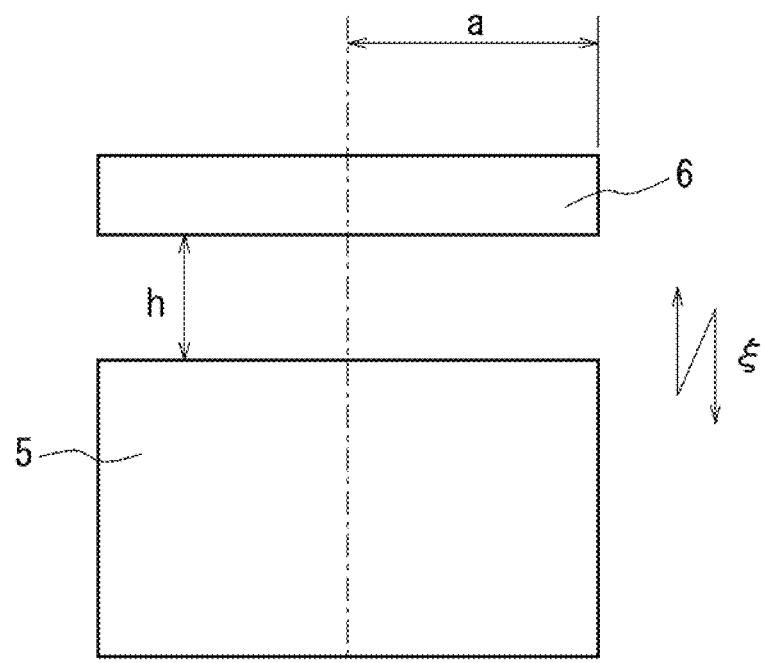
FIG. 5 explains a principle of generating a squeeze film effect, according to an embodiment

According to Langevin's radiation pressure theory, as shown in FIG. 5, the floating force (squeeze force) $F_L$ acting on a circular body 6 with a diameter of a above the vibrating surface of a body 5 which ultrasonically vibrates with a vibration amplitude ξ is expressed by the following formula (1). It should be noted that in the formula (1), $\rho_0$ denotes the air density in the reference state, $c_0$ denotes the sound speed in the reference state, and h denotes the floating distance.

[Formula 1]

$$F_L = \frac{\pi a^2 \rho_0 c_0^2}{4}\left(\frac{\xi}{h}\right)^2 \qquad (1)$$

As apparent from the above formula (1), the squeeze force or the floating force increases with an increase in the vibration amplitude.

However, according to the squeeze film pressure theory, the squeeze force $F_S$ acting on the circular body 6 in FIG. 5 is expressed by the following formula (2). It should be noted that in the formula (2), γ denotes the specific heat ratio, and other variables are the same as those in formula (1).

[Formula 2]

$$F_S = \frac{\pi a^2 \rho_0 c_0^2}{2\gamma} \qquad (2)$$

It has been known as the cause of generating the floating force that as the floating distance becomes very small, Langevin's radiation pressure changes to the squeeze film pressure. Therefore, from the above formula (2), it is understood that in a region having a very small floating distance, the squeeze force increases with an increase in the contact area ($\pi ra^2$).

On the basis of the above described theories, when a person's finger touches the surface of an ultrasonically vibrating body, a squeeze effect is produced on the finger, which generates a floating force on the finger, and the frictional force between the finger and the contact surface decreases. For example, assuming that the friction coefficient μ is about 2.2 when the body surface in a normal state is fingered, the friction coefficient μ reduces to about 0.5 or less when the body surface is ultrasonically vibrated with an amplitude of 2.5 μm.

It should be noted that the floating force produced by the squeeze film effect occurs not only by ultrasonically vibrating the body surface, but also by vibrating the body surface with an audio frequency, for example.

Here, with reference to FIG. 4, assuming that the pressure force in a direction shifted by θ with respect to the normal direction of the plate 1 is F, the force acting in the normal direction is F cos θ. Moreover, assuming that the friction coefficient between the plate 1 and the finger 2 is μ, the frictional force acting on the finger 2 is μF cos θ. Therefore, when the following formula (3) is satisfied, the finger 2 laterally slips, and its position is changed.

[Formula 3]

$$\mu < \tan \theta \qquad (3)$$

When the plate 1 is not vibrated, the friction coefficient μ is equal to or greater than 2, and thus does not satisfy the above formula (3). The reason is that the value of θ is unlikely to exceed about 63° in normal operation. However, when the plate 1 is vibrated to produce a squeeze film effect on the finger 2 to generate a floating force, the friction coefficient μ reduces, and the above formula (3) is satisfied. Therefore, the finger 2 slips in a pulling direction (from left to right in FIG. 4). Even a small amount of slippage of the finger 2 in a pulling direction increases θ from the relation of fingertip moment, and thus the right hand side of the above formula (3) increases. When such a phenomenon is repeated, the frictional force applied to the fingertip in the tangential direction and a force occurring on the fingertip in the normal direction decrease.

As described above, when the plate 1 is pressed, the plate 1 is vibrated in the course of pressing to produce a squeeze film effect on the finger 2 to generate a floating force, thereby reducing the frictional force between the plate 1 and the finger 2. Then, the fingertip slips by a small amount, which can provide the operator with an illusion that the load rapidly decreases. By doing so, the load characteristics when pressed can be expressed in the same manner as in FIG. 1, which can present the operator with the same feeling of pressing as the feeling of operating the push-button switch.

According to an embodiment of the input apparatus in accordance with the present disclosure, on the basis of the above analysis, when a plate-shaped pressing-type input unit is pressed, and when the pressure load satisfies a predetermined criterion in the course of pressing, the input unit is vibrated to produce a squeeze film effect on the pressing object pressing the input unit to generate a floating force, thereby presenting the operator with the same feeling of pressing as the feeling of operating a push-button switch.

Figure 6:
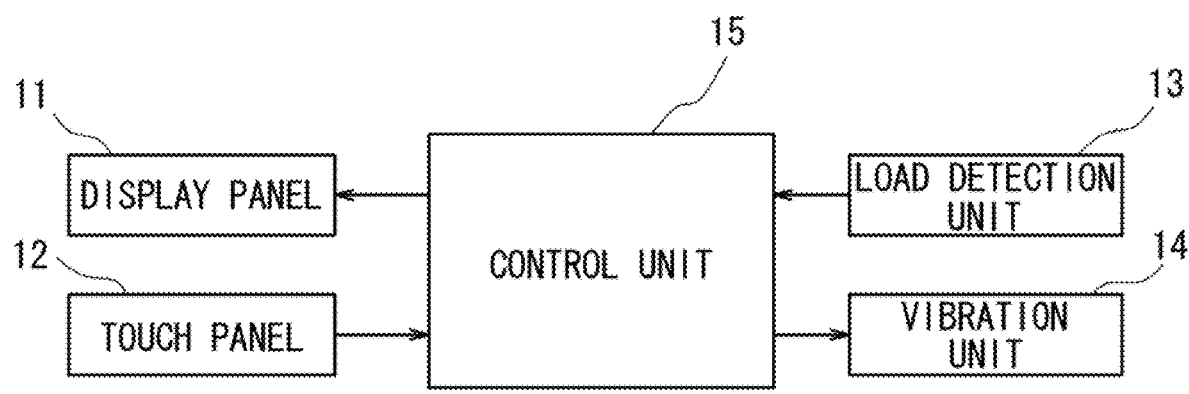
FIG. 6 is a block diagram illustrating a schematic configuration of an input apparatus in accordance with an embodiment.

FIG. 6 is a block diagram illustrating a schematic configuration of an input apparatus in accordance with an embodiment of the present invention. The input apparatus includes a display panel 11, a touch panel 12, a load detection unit 13, a vibration unit 14, and a control unit 15 for controlling the entire operation. The display panel 11 constitutes a display unit for displaying an input object such as an input button, and is configured, for example, using a liquid crystal display panel, an organic EL display panel, or the like. The touch panel 12 constitutes an input unit for accepting a pressure input to the display panel 11, and is configured, for example, using a well known technique such as a resistive film type and a capacitance type technique. The load detection unit 13 detects a pressure load to the touch panel 12, and is configured, for example, using a strain gauge sensor. The vibration unit 14 vibrates the touch panel 12, and is configured, for example, using a Langevin-type ultrasonic transducer (piezoelectric element).

FIG. 7 illustrates an example structure of implementing the input apparatus shown in FIG. 6. FIG. 7A is a sectional view of essential parts thereof and FIG. 7B is a plan view of essential parts thereof. The display panel 11 is housed and maintained in a casing 21. The display panel 11 holds the touch panel 12 thereabove via an insulator 22 made of an elastic member. It should be noted that according to the input apparatus in accordance with the present embodiment, the display panel 11 and the touch panel 12 are configured to be rectangular in a plan view, and the touch panel 12 is held above the display panel 11 via the insulator 22 arranged in the four corners outside the display area A of the display panel 11 illustrated by a virtual line in FIG. 7B.

The casing 21 is provided with an upper cover 23 so as to cover the surface area of the touch panel 12 extending beyond the display area of the display panel 11. The insulator 24 made of an elastic member is provided between the upper cover 23 and the touch panel 12.

It should be noted that the touch panel 12 is configured using such a structure as, for example, the upper surface thereof, namely, the operation surface is made of a transparent film and the rear surface thereof is made of glass, and when the operation surface is pressed, the transparent film of the surface is bent (deformed) by a very small amount depending on the pressure force.

According to the input apparatus in accordance with the present embodiment, a strain gauge sensor 31 for detecting a load (pressure force) applied to the touch panel 12 is provided by bonding or the like on the transparent film on the surface of the touch panel 12 in the vicinity of each side covered with the upper cover 23. Moreover, a Langevin-type ultrasonic transducer 32 for ultrasonically vibrating the touch panel 12 is provided by bonding or the like in the vicinity of two opposite sides on the glass surface on the rear side of the touch panel 12 respectively. In other words, according to the input apparatus shown in FIG. 7, four strain gauge sensors 31 are used to configure the load detection unit 13 shown in FIG. 6, and two ultrasonic transducers 32 are used to configure the vibration unit 14. It should be noted that FIG. 7B does not illustrate the casing 21, the upper cover 23, and the insulator 24 shown in FIG. 7A.

According to the input apparatus in accordance with the present embodiment, the control unit 15 monitors an input to the touch panel 12 and also monitors a load detected by the load detection unit 13. When the input to the touch panel 12 is an input to an input object displayed on the display panel 11, and the pressure load detected by the load detection unit 13 satisfies a predetermined criterion (the third criterion) for accepting the input, the control unit 15 drives the vibration unit 14 to ultrasonically vibrate the touch panel 12 to produce a squeeze film effect on the pressing object such as a finger or a stylus pen pressing the touch panel 12. That is, a floating force is generated on the pressing object such as a finger or a stylus pen pressing the touch panel 12. In other words, the frictional force between the touch panel 12 and the pressing object such as a finger or a stylus pen pressing the touch panel 12 is reduced. It should be noted that the load detection unit 13 detects the load from an average value of the outputs from the four strain gauge sensors 31. For example, the vibration unit 14 drives the two ultrasonic transducers 32 in phase.

Figure 8:
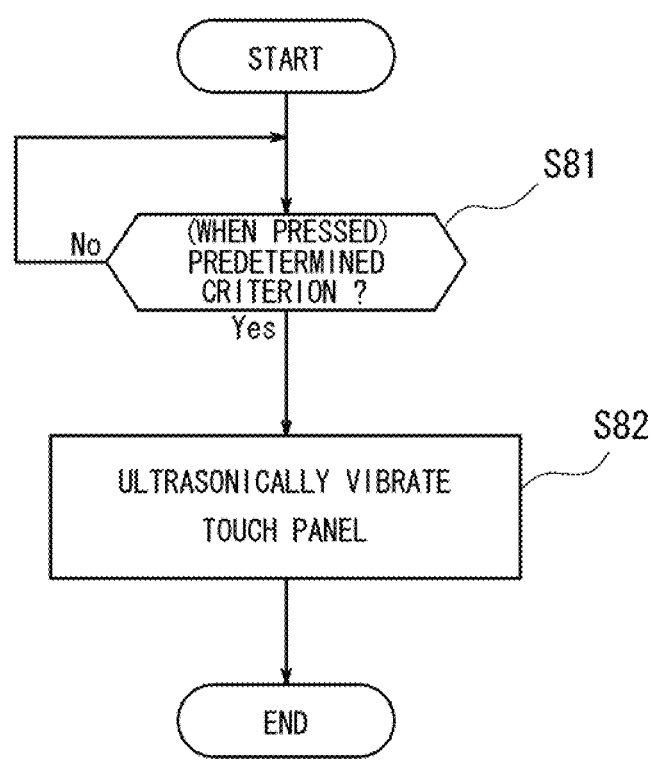
FIG. 8 is a flowchart showing an operation of a control unit shown in FIG. 6, according to an embodiment.

FIG. 8 is a flowchart showing an operation of the control unit 15 of the input apparatus in accordance with the present embodiment. More specifically, when a detection is made that the input to the touch panel 12 is an input to an input object displayed on the display panel 11, and the pressure load detected by the load detection unit 13 satisfies a predetermined criterion for accepting the input (Step S81), the control unit 15 accepts the input to the touch panel 12 at the point of time, and drives the vibration unit 14 for a predetermined time period to ultrasonically vibrate the touch panel 12 with a predetermined vibration amplitude (Step S82). This causes a squeeze film effect to be produced on the pressing object pressing the touch panel 12. That is, a floating force is generated on the pressing object pressing the touch panel 12. In other words, the frictional force between the touch panel 12 and the pressing object pressing the touch panel 12 is reduced. This allows the operator to get a feeling of pressing and to recognize that the input operation has completed.

Here, the predetermined criterion detected in Step S81 of FIG. 8 corresponds to the load in point B shown in FIGS. 1 and 2. The drive time of the vibration unit 14 driven in Step S82 corresponds to the time t1 from point B to point C shown in FIG. 2. That is, the load (pressure force) for starting to ultrasonically vibrate the touch panel 12, the vibration amplitude and the vibration time of ultrasonic vibration may be appropriately set according to the load characteristics when the target push-button switch is pressed.

As described above, according to the input apparatus in accordance with the present embodiment, the touch panel 12 is used to make an input corresponding to an input object, and a load applied to the touch panel 12 is detected by the load detection unit 13. When the load reaches a predetermined value for accepting the input to the touch panel 12, the vibration unit 14 is driven to produce a squeeze film effect. That is, the vibration unit 14 is driven to generate a floating force. In other words, the vibration unit 14 is driven to reduce a frictional force. This allows the operator to get a feeling of pressing and to recognize that the input operation has completed. Therefore, the operator can comfortably operate the touch panel 12 with the same feeling of pressing as the feeling of operating a push-button switch. Moreover, the operator can perform an input operation consciously with a feeling of "pressing" the touch panel 12, and thus can prevent an input error simply by pressing. Further, unlike Japanese Patent Laid-Open No. 2005-92472, the touch panel need not be moved together with the display panel, and thus the configuration can be simplified as well as the entire device can be made compact. Still further, the operator can get, not a feeling of pressing the touch panel by moving the touch panel, but a real feeling of pressing a push-button switch.

When a push-button switch is operated, a tactile stimulus is given on the finger from the push-button switch, not only when pressed but also when released. In order to present the operator with a feeling (tactile feeling) closer to the feeling of operating a push-button switch than the first embodiment, the second embodiment provides the operator with a tactile stimulus when released to allow the operator to get a feeling of releasing the push-button.

According to the input apparatus in accordance with one embodiment, the control unit 15 in the input apparatus in accordance with the first embodiment further controls as follows. The control unit 15 accepts a pressure input to the touch panel 12 and then, when the pressing object such as a finger or a stylus pen is released from the touch panel 12 and the pressure load detected by the load detection unit 13 satisfies a predetermined criterion (the fourth criterion), the control unit 15 controls driving of the vibration unit 14 so as to produce a squeeze film effect on the pressing object, that is, to generate a floating force on the pressing object, namely, to reduce the frictional force between the pressing object and the touch panel 12.

Figure 9:
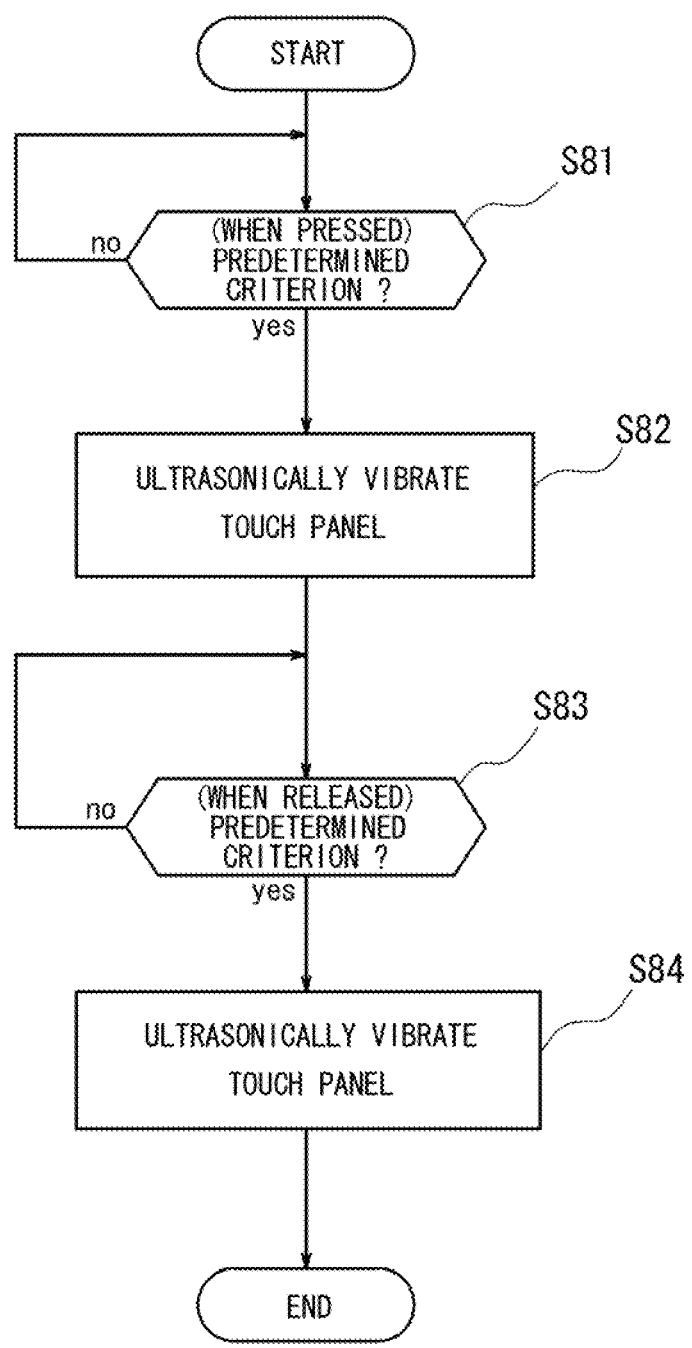
FIG. 9 is a flowchart showing an operation of the input apparatus in accordance with an embodiment.

FIG. 9 is a flowchart showing an operation of the input apparatus in accordance with one embodiment. More specifically, the control unit 15 performs the processes in Step S81 and Step S82 described in FIG. 8. Then, when a detection is made that the load detected by the load detection unit 13 decreases and satisfies a predetermined criterion (the fourth criterion) (Step S83), the control unit 15 drives the vibration unit 14 for a predetermined time period to ultrasonically vibrate the touch panel 12 with a predetermined vibration amplitude (Step S84).

Here, the predetermined criterion detected in Step S83 of FIG. 9 is assumed to be the load in point E shown in FIGS. 1 and 3. The drive time of the vibration unit 14 driven in Step S84 is assumed to be the time t2 from point E to point F shown in FIG. 3. It should be noted that the load for starting to ultrasonically vibrate when released, the drive time of the vibration unit 14, and the vibration amplitude of the touch panel 12 may be appropriately set according to the load characteristics when the target push-button switch is released. Therefore, the same values as when pressed may be set.

As described above, producing a squeeze film effect on the pressing object with a predetermined load when released, that is, generating a floating force on the pressing object, namely, reducing the frictional force between the pressing object and the touch panel 12, allows the operator to get a tactile stimulus and get a feeling of releasing the push-button switch when the push button is released. Therefore, the input apparatus in accordance with the present embodiment can present the operator with a feeling of pressing when pressed and a feeling of releasing when released, thereby presenting the operator with a feeling (tactile feeling) closer to the feeling of pressing a push-button switch than the first embodiment.

Figure 10:
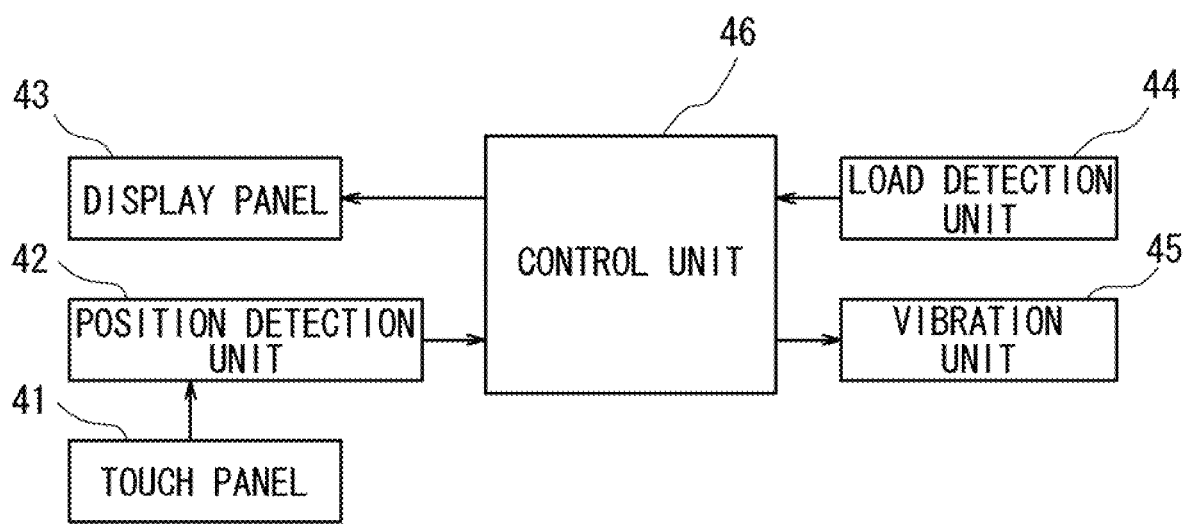
FIG. 10 is a block diagram illustrating a schematic configuration of the input apparatus in accordance with an embodiment.
Figure 11:
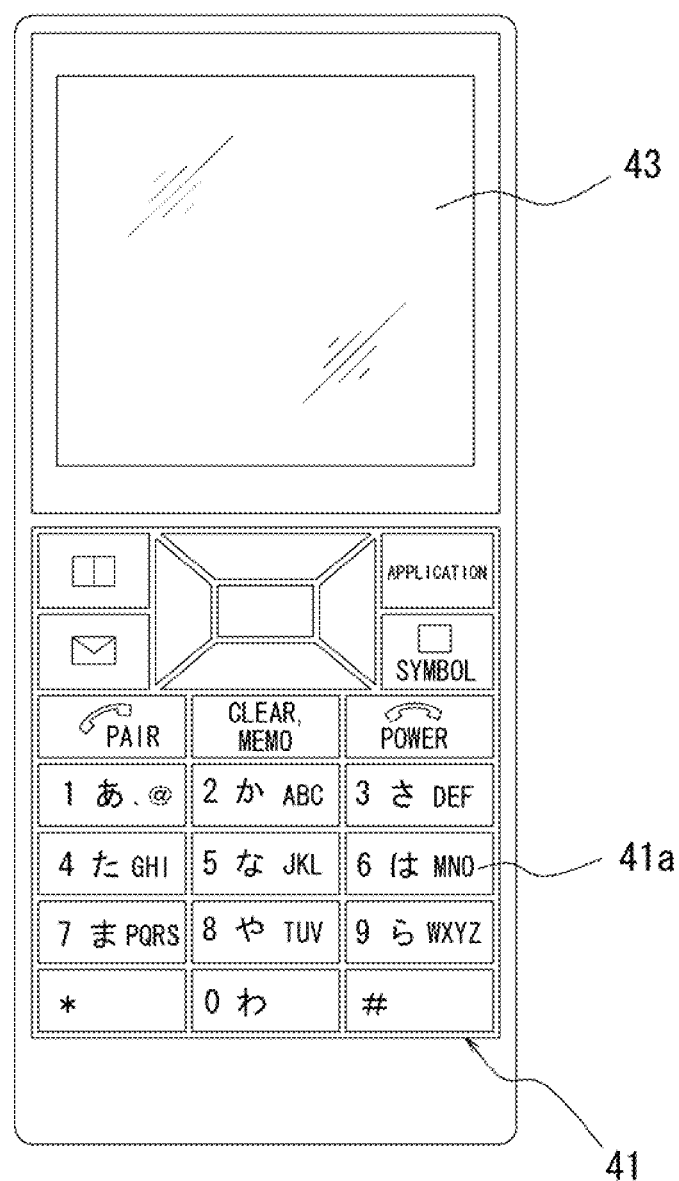
FIG. 11 is a front view of the input apparatus shown in FIG. 10, according to an embodiment.

FIGS. 10 and 11 illustrate the input apparatus in accordance with one embodiment of the present disclosure. FIG. 10 is a block diagram illustrating a schematic configuration thereof and FIG. 11 is a front view thereof respectively. The input apparatus is mounted, for example, on a mobile terminal and, as shown in FIG. 10, includes a touch panel 41 serving as the input unit for accepting a pressure input; a position detection unit 42 for detecting an input position to the touch panel 41; a display panel 43 for displaying information based on the input position detected by the position detection unit 42; a load detection unit 44 for detecting a pressure load to the touch panel 41; a vibration unit 45 for vibrating the touch panel 41; and a control unit 46 for controlling the entire operation.

As shown in FIG. 11, a plurality of input objects 41a such as numeric keys are formed in advance by being printed or attached on the touch panel 41. In order to prevent an input error due to simultaneously pressing a plurality of adjacent input objects 41a, the effective pressure area for accepting an input is set to be narrower than the area of the individual input object 41a. With reference to FIG. 10, the load detection unit 44 and the vibration unit 45 use a strain gauge sensor and a Langevin-type ultrasonic transducer to detect a pressure load to the touch panel 41 and vibratably configure the touch panel 41 in the same manner as the input apparatus shown in FIG. 7.

According to the input apparatus in accordance with one embodiment, the control unit 46 monitors an input to the touch panel 41 and a load detected by the load detection unit 44 as well as an input position to the touch panel 41 detected by the position detection unit 42. When the position detection unit 42 detects an input position of the input object in the effective pressure area thereof and the pressure load detected by the load detection unit 44 satisfies a predetermined criterion (the first criterion) for accepting the input detected by the touch panel 41, the vibration unit 45 vibrates the touch panel 41 to produce a squeeze film effect on the pressing object such as a finger or a stylus pen pressing the touch panel 41. That is, a floating force is generated on the pressing object such as a finger or a stylus pen pressing the touch panel 41. In other words, the frictional force between the touch panel 41 and the pressing object such as a finger or a stylus pen pressing the touch panel 41 is reduced. Moreover, the control unit 46 accepts the input detected by the touch panel 41 and performs display according to the input to the display panel 43.

As described above, according to the input apparatus in accordance with one embodiment, a desired input object 41a is formed on the touch panel 41. When an effective pressure area thereof is pressed and then the pressure load reaches a predetermined value for accepting the input to the touch panel 41, the vibration unit 45 is driven to produce a squeeze film effect in the same manner as the input apparatus in accordance with the first embodiment. That is, the vibration unit 45 is driven to generate a floating force. In other words, the vibration unit 45 is driven to reduce a frictional force. This allows the operator to get a feeling of pressing and to recognize that the input operation has completed. Therefore, the operator can comfortably perform an input operation on the touch panel 41 with the same feeling of pressing as the feeling of operating a push-button switch. Moreover, the operator can perform an input operation consciously with a feeling of "pressing" the touch panel 41, and thus can prevent an input error simply by pressing. Further, the touch panel 41 need only be vibratably configured, and thus the entire touch panel 41 need not be movably configured. Therefore, the configuration can be simplified as well as the entire device can be made compact.

It should be noted that according to the input apparatus in accordance with one embodiment, when the touch panel 41 is pressed, the drive of the vibration unit 45 is controlled. However, an input to the touch panel 41 is accepted, and then the pressing object such as a finger or a stylus pen is released from the touch panel 41. At this time as well, producing a squeeze film effect on the pressing object, that is, generating a floating force on the pressing object, namely, reducing the frictional force between the pressing object and the touch panel 41, allows the operator to get a tactile stimulus and get a feeling of releasing the push-button switch when the push button is released. In this case, when a detection is made that the load detected by the load detection unit 44 reduces and reaches a predetermined criterion (the second criterion), the vibration unit 45 vibrates the touch panel 41 to produce a squeeze film effect in the same manner as the input apparatus described in a foregoing embodiment. That is, the floating force is generated. In other words, the frictional force is reduced.

Hereinafter, in accordance with the above individual embodiments, various embodiments of the load (pressure force) for starting to vibrate the touch panel, the vibration amplitude, and the vibration time will be described.

For example, through experiments on a metal dome switch widely used in a mobile terminal available on the market, it is found that, with some variations depending on the types of terminal, the metal dome switch has a load characteristic that when a predetermined load of 0.98 N (100 gf) or more is applied thereto, the load rapidly decreases. Further, through experiments on the input apparatus shown in FIGS. 6 and 7 such that when the pressing of the touch panel 12 was started and the load reached a predetermined value such as about 0.98 N, the touch panel 12 was ultrasonically vibrated at a vibrational frequency of 28.2 KHz, with a vibration amplitude of 4 μm or more, and for the vibration time ranging 16 ms to 24 ms.

Figure 12:
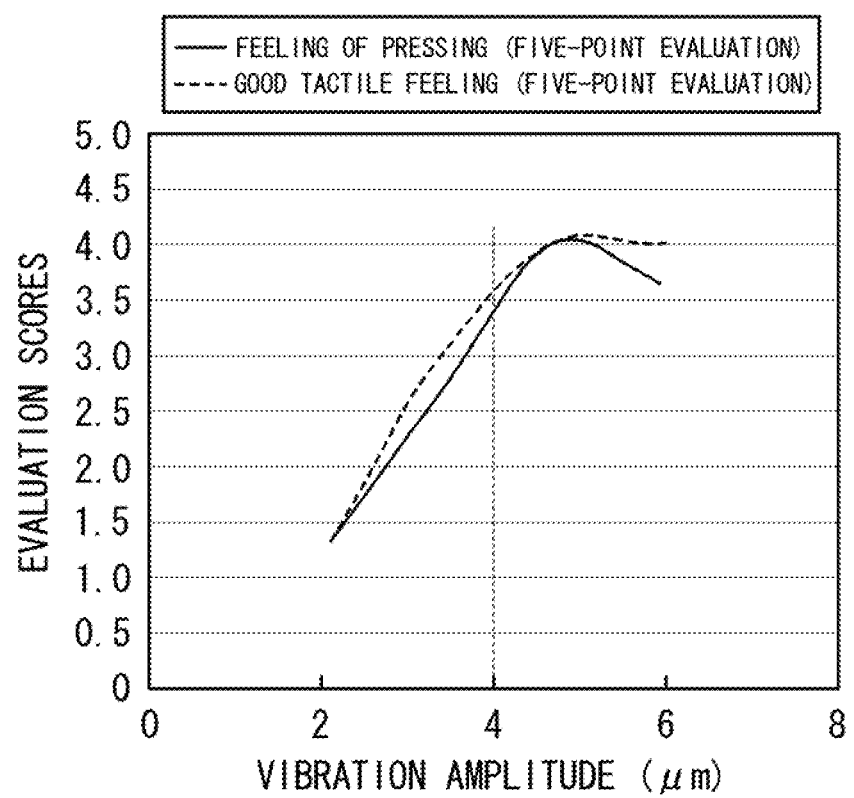
FIG. 12 illustrates the results of experiments made with variable vibration amplitudes and evaluation scores, according to an embodiment.
Figure 13:
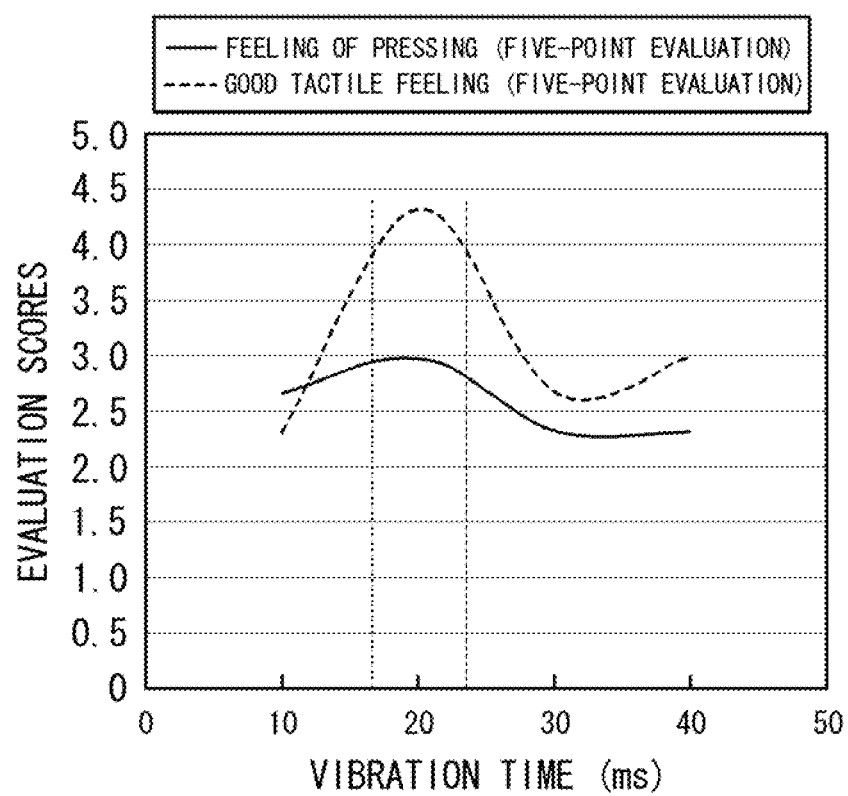
FIG. 13 illustrates the results of experiments made with variable vibration times and evaluation scores, according to an embodiment.
Figure 14:
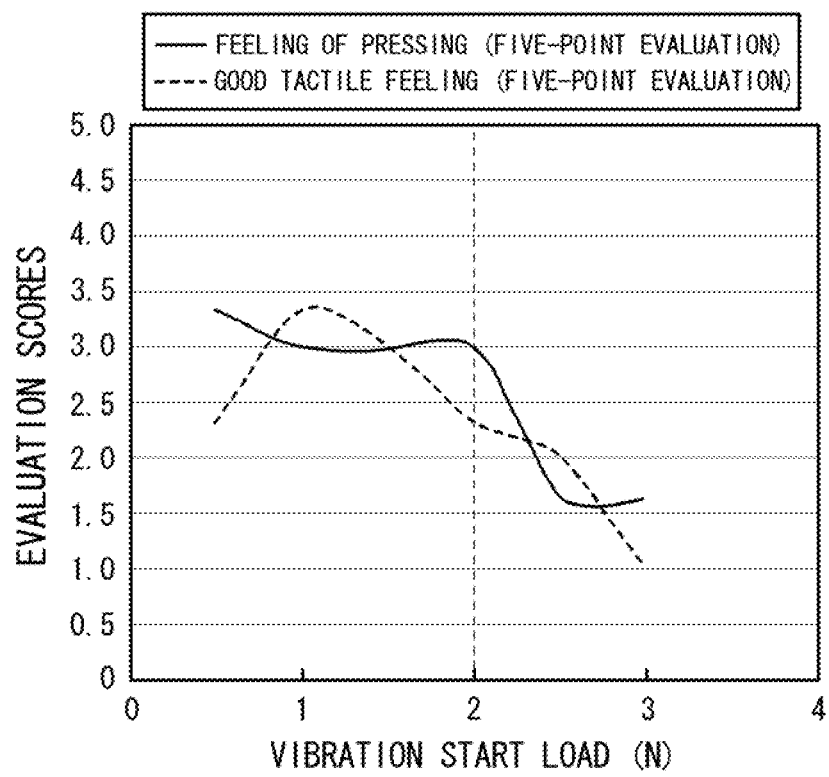
FIG. 14 illustrates the results of experiments made with variable vibration start loads and evaluation scores, according to an embodiment.

As a result, it is determined that one can present the operator with a feeling of "pressing" as the feeling of operating the metal dome switch. In addition, it has been confirmed that one can present the operator with an appropriate feeling of pressing when ultrasonic vibration is started with a load of 2 N or less. It should be noted that in the experiments, when the finger was released from the touch panel 12, the vibration unit 14 was driven under the same conditions as when the touch panel 12 was pressed. The evaluation results are shown in FIGS. 12 to 14. It should be noted that the drive signal waveform of the vibration unit 14 is assumed to be a sine wave, in accordance with one exemplary embodiment.

FIG. 12 illustrates the evaluation results of experiments with a load of 0.98 N at the time of starting driving of the vibration unit 14, for a vibration time of 20 ms, with a vibration amplitude variable between 2.0 μm and 6.0 μm. Here, the evaluators are three males in their twenties accustomed to using a mobile terminal, and the evaluation items are whether to get "a feeling of pressing" (shown by a solid line) and whether to get "a good tactile feeling" (shown by a broken line). As the evaluation scores for the evaluation item "a feeling of pressing", point 1 indicates "do not feel", point 3 indicates "feel", and point 5 indicates "strongly feel"; as the evaluation scores for the evaluation item "a good tactile feeling", point 1 indicates "bad", point 3 indicates "fair", and point 5 indicates "good"; and the average points are shown respectively.

As apparent from FIG. 12, when the vibration amplitude is equal to or greater than 4 μm, the evaluation is high, and the operator can get a feeling of pressing; but when the vibration amplitude is less than 4 μm, the evaluation is low, and the operator cannot get an enough feeling of pressing. The reason is assumed to be that a vibration amplitude of less than 4 μm cannot produce an enough squeeze film effect for the operator to get a feeling of pressing.

FIG. 13 illustrates the evaluation results of experiments with a load of 0.98 N at the time of starting driving of the vibration unit 14, at a vibration amplitude of 4.0 μm, and for a vibration time variable between 10 ms and 40 ms. The evaluators, evaluation items, and evaluation scores are the same as in the case of FIG. 12.

As apparent from FIG. 13, when the vibration time is between 16 ms and 24 ms, the evaluators can get a feeling of pressing. From this result, when the vibration time is shorter than 16 ms, even if a squeeze film effect is produced, the evaluators cannot get "a feeling of rapid decrease in power"; and when the vibration time is longer than 24 ms, the evaluators feel uncomfortable since the time period of "rapid decrease in power" is too long, and thus the evaluators are unlikely to get a feeling of pressing.

FIG. 14 illustrates the evaluation results of experiments of the vibration unit 14 at a vibration amplitude of 4.0 μm, for a vibration time of 20 ms, and with a load at the time of starting vibration variable between 0.5 N and 3.0 N. The evaluators, evaluation items, and evaluation scores are the same as in the case of FIGS. 12 and 13.

As apparent from FIG. 14, if the drive of the vibration unit 14 started when the load detected by the load detection unit 13 is equal to or less than 2 N, the evaluation is high, and the operator can get a feeling of pressing. However, if the drive of the vibration unit 14 started when the load exceeding 2 N is detected, the operator scarcely can get a feeling of pressing. The reason is assumed to be that a load of 2 N or more increases a power element in a plane direction of the touch panel 12; in that state, producing a squeeze film effect increases a shift of the finger due to a decrease in frictional resistance; and thus the evaluators feel uncomfortable.

It should be noted that regarding the vibrational frequency of the touch panel 12, it is confirmed that any frequency capable of generating a floating force not limited to an ultrasonic frequency of 28.2 KHz can produce the same results. Regarding the drive signal waveform of the vibration unit 14, it is also confirmed that any waveform capable of vibrating the touch panel 12, not only a sine wave, but also a rectangular wave and a saw tooth wave, can produce the same results.

As apparent from the above evaluation results, the input apparatus in accordance with the above individual embodiments applied to the mobile terminal can present the operator with the same feeling of pressing as the feeling of operating the metal dome switch under the conditions that the touch panel is ultrasonically vibrated when a predetermined load of 0.98 N or more and 2 N or less is applied, at a vibration amplitude of 4 μm or more, for a vibration time between 16 ms and 24 ms.

It should be noted that the present invention is not limited only to the above embodiments, but many modifications or changes can be made. For example, the load detection unit can be configured using any number of strain gauge sensor, and as long as the load detection unit can detect a load based on a signal output from the touch panel, the load detection unit can be configured without using a strain gauge sensor. In addition, the vibration unit can be configured using any number of transducers (piezoelectric elements), and can also be configured by providing transparent piezoelectric elements on the entire surface of the operation surface of the touch panel. Further, the predetermined criterion of the present invention may be different for each case, or may be the same. For example, the predetermined criterion (the fourth criterion) in accordance with the second embodiment may be set lower than the predetermined criterion (the third criterion) in accordance with the first embodiment. When the predetermined criterion (the fourth criterion) when released is set lower than the predetermined criterion (the third criterion) when pressed, it is possible to present the pressing object with a feeling of pressing and then present the pressing object with a feeling of releasing without fail.

Moreover, the present invention can be effectively applied to an input apparatus in which the input unit functions as a switch. Further, the input apparatus in accordance with the present invention can sequentially produce a squeeze film effect based on a different criterion (load) while the input unit is being pressed, thereby providing a load characteristic of a multistage switch such as a two-stage switch (pressed halfway and then fully pressed). If this is applied to the shutter release button of a camera, focus lock (halfway pressing) and release (full pressing) are enabled. In combination of the display unit, the display such as the menu screen can be changed diversely according to the number of stages of pressing. Further, in order to provide load characteristics of the multistage switch, the vibration amplitude and the vibration time of the input unit for each stage can also be changed to present the operator with a different feeling of pressing for each stage.

Moreover, the present invention drives the vibration unit when the pressure load detected by the load detection unit satisfies a predetermined criterion for accepting the input. Here, the time when the pressure load detected by the load detection unit satisfies a predetermined criterion for accepting the input may be the time when the pressure load detected by the load detection unit reaches a predetermined value for accepting the input, may be the time when the pressure load detected by the load detection unit exceeds a predetermined value for accepting the input or may be the time when a predetermined value for accepting the input is detected by the load detection unit.

What is claimed is:
1. An input apparatus comprising:
a display unit configured to display an input object;
a touch panel configured to accept a pressure input applied to the input object by a pressing object;
a load detection unit configured to detect a pressure load to the touch panel applied by the pressing object;
a vibration unit configured to ultrasonically vibrate the touch panel; and
a control unit configured to control the vibration unit so that the vibration unit refrains from vibrating the touch panel, after detection of the pressure load, until a first predetermined criterion about the pressure load for an input operation to be received at the input object is satisfied, while the pressure load fails to satisfy the first predetermined criterion during application of the pressure input, starts vibrating the touch panel according to a predetermined vibration frequency and a predetermined vibration amplitude in response to the pressure load satisfying the first predetermined criterion during application of the pressure input, and stops vibrating the touch panel after a predetermined vibration time, so as to provide a feeling of pressing a button to an operator of the pressing object, wherein the predetermined vibration frequency, the predetermined vibration amplitude and the predetermined vibration time are selected to cause the pressing object to slip laterally from a stationary position with respect to the touch panel when the pressure load is not applied normal to the touch panel.

2. The input apparatus according to claim 1, wherein the vibration unit controls at least one of a vibration amplitude and a vibration time when the pressure load satisfies first and second predetermined criteria.

3. The input apparatus according to claim 1, further comprising:
a position detection unit which detects an input position to the touch panel, wherein
the input object is formed on the touch panel, and
when the position detection unit detects the input position where the input object is formed, the control unit controls driving of the vibration unit.

4. The input apparatus according to claim 2, further comprising:
a position detection unit which detects an input position to the touch panel, wherein
the input object is formed on the touch panel, and
when the position detection unit detects the input position where the input object is formed, the control unit controls driving of the vibration unit.

5. The input apparatus according to claim 1, wherein the control unit controls so that the vibration unit ultrasonically vibrates the touch panel in response to the pressure load so as to generate a floating force on the pressing object pressing the touch panel.

6. The input apparatus according to claim 1, wherein the control unit controls so that the vibration unit ultrasonically vibrates the touch panel in response to the pressure load so as to produce a squeeze film effect on the pressing object pressing the touch panel.

7. The input apparatus according to claim 1, wherein the control unit controls so that the vibration unit ultrasonically vibrates the touch panel in response to the pressure load so as to reduce a frictional force between the input unit and the pressing object pressing the touch panel.

8. The input apparatus according to claim 1, wherein the control unit controls the vibration unit so that the vibration unit ultrasonically vibrates the touch panel in response to the pressure load regardless of a position of the pressing object on the touch panel within a predetermined effective pressure area.

9. The input apparatus according to claim 1, wherein the predetermined vibration frequency, the predetermined vibration amplitude and the predetermined vibration time are selected to satisfy the condition:

$\mu < \tan \theta$, wherein $\mu$ represent a coefficient of friction between the touch panel and the pressing object and $\theta$ represents an angle between the touch panel and the pressing object.

10. The input apparatus according to claim 1, wherein $\theta$ is less than or equal to 63 degrees.

11. An input apparatus comprising:
a display unit configured to display an input object;
an input unit configured to accept a pressure input applied to the input object by a pressing object; and
a vibration unit configured to
refrain from vibrating the input unit, after detection of a pressure load applied by the pressing object, until a first predetermined criterion about the pressure load for an input operation to be received at the input object is satisfied, while the pressure load applied by the pressing object fails to satisfy the first predetermined criterion during application of the pressure input, start to ultrasonically vibrate the input unit according to a predetermined vibration frequency and a predetermined vibration amplitude in response to the pressure load satisfying the first predetermined criterion during application of the pressure input, and stop vibrating the input unit after a predetermined vibration time, so as to provide a feeling of pressing a button to an operator of the pressing object, wherein the predetermined vibration frequency, the predetermined vibration amplitude and the predetermined vibration time are selected to cause the pressing object to slip laterally from a stationary position with respect to the input unit when the pressure load is not applied normal to the input unit.

12. The input apparatus according to claim 11, further comprising:
a load detection unit which detects the pressure load to the input unit; and
a control unit which, when the pressure load detected by the load detection unit satisfies first and second predetermined criteria, controls such that the vibration unit ultrasonically vibrates the input unit.

13. An input apparatus comprising:
a display unit configured to display an input object;
a touch panel configured to accept a pressure input applied to the input object by a pressing object;
a load detection unit configured to detect a pressure load to the touch panel applied by the pressing object;
a vibration unit configured to ultrasonically vibrate the touch panel; and
a control unit configured to control the vibration unit so that the vibration unit
refrains from vibrating the touch panel while the pressure load fails to satisfy a first predetermined criterion about the pressure load for an input operation to be received at the input object during application of the pressure input,
starts vibrating the touch panel at a predetermined constant vibration frequency and a predetermined constant vibration amplitude that produce a squeeze film effect on the pressing object regardless of a position of the pressing object within the input object in response to the pressure load satisfying the first predetermined criterion during application of the pressure input, and
stops vibrating the touch panel after vibrating the touch panel at the predetermined constant vibration frequency and the predetermined constant vibration amplitude for a predetermined vibration time, so as to provide a feeling of pressing a button to an operator of the pressing object, wherein the predetermined vibration frequency, the predetermined vibration amplitude and the predetermined vibration time are selected to cause the pressing object to slip laterally from a stationary position with respect to the touch panel when the pressure load is not applied normal to the touch panel.

* * * * *